US007139223B1

United States Patent
Scarzello et al.

(10) Patent No.: US 7,139,223 B1
(45) Date of Patent: Nov. 21, 2006

(54) DEEP WATER SURVEILLANCE SYSTEM

(75) Inventors: John F. Scarzello, Columbia, MD (US); John J. Holmes, Columbia, MD (US); Edward C. O'Keefe, Columbia, MD (US); Robert A Wingo, Manassas, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/151,184

(22) Filed: May 26, 2005

(51) Int. Cl.
*G02B 6/00* (2006.01)
(52) U.S. Cl. ........................ 367/149; 367/131
(58) Field of Classification Search ............... 367/149, 367/131; 385/12, 13; 250/227.16
See application file for complete search history.

(56) References Cited

U.S. PATENT DOCUMENTS 6,765,487 B1    7/2004  Holmes et al.
6,961,657 B1 *  11/2005 Wernli et al. ............... 367/131

\* cited by examiner

*Primary Examiner*—Dan Pihulic
(74) *Attorney, Agent, or Firm*—Jacob Shuster

(57) ABSTRACT

An elongated optical fiber is vertically positioned within seawater in a deep-depth targeted zone by vertical suspension thereof from a floating buoy. Electrode sensor arrays are positioned in vertically spaced relation to each other on the optical fiber for generating warning signals in response to detection of hostile conditions. The warning signals are converted into signal data collected and transferred to a transmitter in the floating buoy from which the sensor arrays are suspended within the targeted zone positioned on the optical fiber. Such collected data signals are transmitted through an antenna within the floating buoy to locations above the seawater surface for surveillance purposes.

4 Claims, 2 Drawing Sheets

US 7,139,223 B1

DEEP WATER SURVEILLANCE SYSTEM

CROSS-REFERENCE TO RELATED APPLICATION

This application claims the benefit of U.S. application Ser. No. 11/151,182 filed May 26, 2005, Navy Case No. 96,494 entitled "UNDERWATER SURVEILLANCE SYSTEM", incorporated herein by reference.

The present invention relates generally to surveillance and collection of data with respect to conditions within deep underwater targeted zones for signal transmission to locations above the seawater.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Surveillance systems have been employed to detect hostile environments within underwater targeted zones, involving use of magnetic and electric field sensing technologies. The underwater conditions to be detected by such surveillance involved corrosion related to electric current and electrically powered equipment on submarines, surface ships and other underwater vehicles, and ship hull materials. It is therefore an important object of the present invention to maximize detection of such underwater hostile conditions within deepwater targeted surveillance zones.

SUMMARY OF THE INVENTION

Pursuant to the present invention, underwater surveillance of a deep-water targeted zone within a body of seawater involves use of one or more electric field sensors deployed within the seawater by vertical suspension from a floating buoy. When a plurality of the field sensors are utilized they are arranged in vertically spaced relation to each other about a common optical fiber connected at its upper end by a motion isolator to the floating buoy. An electrically conductive metallic cladding covers the optical fiber, exposed to the seawater along upper and lower electrode sensing sections thereof separated by an intermediate insulating electronic node section within which the metallic cladding is covered by a water resistant coating within an outer water insulating housing. The upper and lower electrode sensing sections of the sensor array when deployed and powered in response to closing of a water sensing switch, feed input surveillance data signals to a wideband amplifier within the housing of the electronic node section from which low and high band frequency outputs are filtered and registered by threshold detectors for signal encoding before transfer to data transmitter circuitry within the floating buoy connected to a radio frequency signal transmitting antenna. Surveillance data derived from the signal data and collected from all of the electrode sensor arrays is transmitted by the antenna as warning signals to locations above the seawater level for evaluation thereat to determine the existence of hostile conditions within the targeted underwater zone so that factual measures may be taken to deal therewith.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
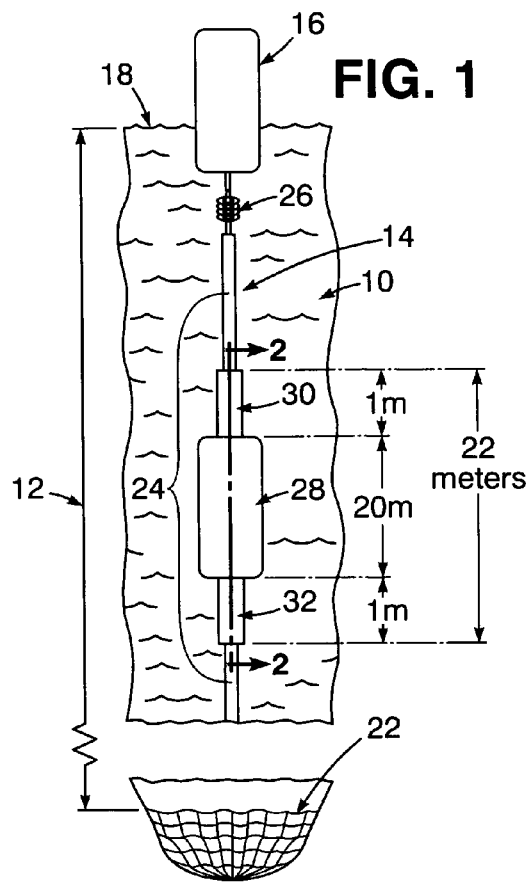
FIG. 1 is a side elevation view of a deep-depth targeted underwater zone within a body of seawater, with a surveillance system deployed therein in accordance with one embodiment of the present invention.

Referring now to the drawing in detail, FIG. 1 illustrates a body of seawater 10 within which underwater surveillance is to be performed by means of a plurality of field sensing arrays each one of which is generally referred to by reference numeral 14. The seawater 10 has a depth greater than 300 meters much greater than the length of all of the field sensing arrays 14 being utilized which are vertically suspended from a floating data transmitting module buoy 16 projecting above a top seawater level surface 18. The sensing arrays 14 suspended below the top-most one the arrays 14 underlying the buoy 16 as shown in FIG. 1, occupy relatively deep underwater target zone. Each of the vertically suspended sensing arrays 14 may have a total length of 22 meters, as denoted in FIG. 1, and is positioned in vertically spaced relation to each other on one optical fiber 24 suspended from the floating buoy 16 by a motion isolator 26 at the upper end of the optical fiber 24 above the top-most one of the sensing arrays 14.

Figure 2:
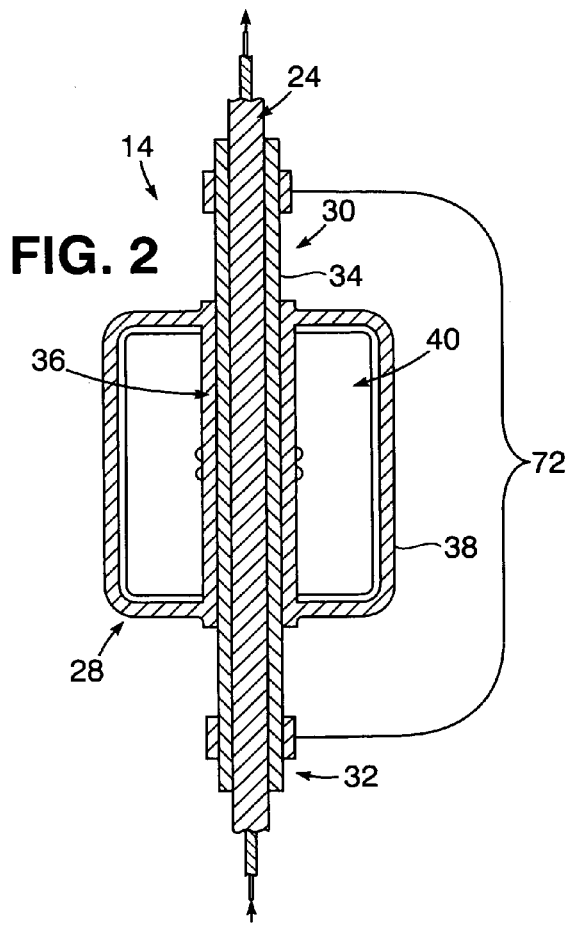
FIG. 2 is an enlarged section view taken substantially through a plane indicated by section line 2—2 in FIG. 1, illustrating an electrode sensor array.

Each of the sensing arrays 14 includes an intermediate electronic node section 28 located between upper and lower electrode node sections 30 and 32 of 1 meter length, spaced apart by 20 meters so as to form a total length of 22 meters as shown in FIG. 1. A metallic cladding 34 covers the optical fiber 24 entirely within each of the arrays 14. The cladding 34 is exposed to the seawater 10 along the electrode sections 30 and 32, above and below an outer water resistant coating 36 thereon within the electronic node section 28 as shown in FIG. 2. An outer water insulting housing 38 encloses data signal generating and transmitting circuitry 40 within the node section 28. Optical communication is effected from the circuitry 40 within the housing 38 of the node section 28 through the fiber 24 extending to the floating buoy 16 as hereinafter explained.

Figure 3:
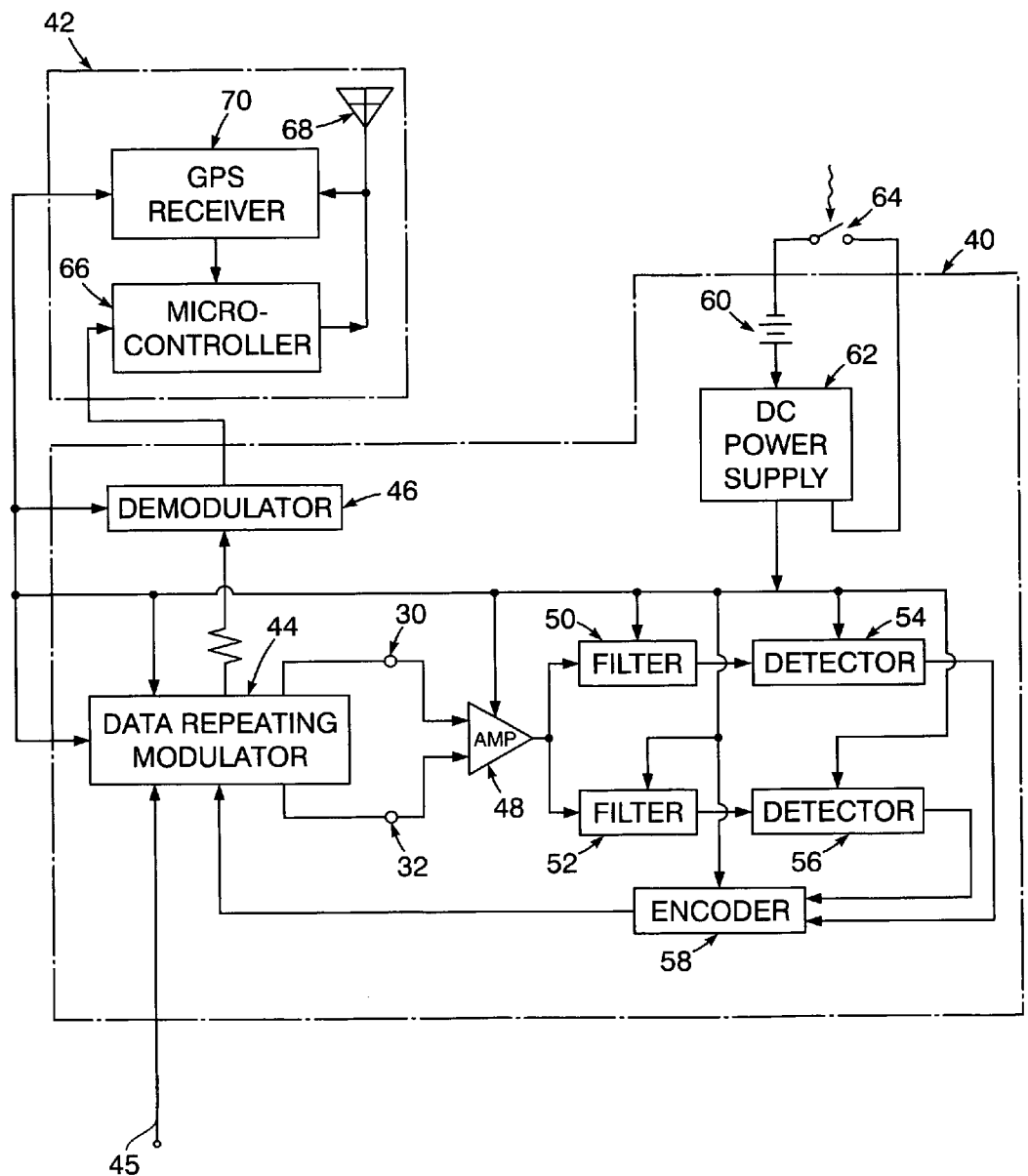
FIG. 3 is a circuit diagram illustrating the electronic circuitry associated with the sensor array shown in FIGS. 1 and 2.

FIG. 3 diagrams the circuitry 40 associated with each of the sensing arrays 14 and data transmitting circuitry 42 located within the buoy 16 that is connected thereto so as to perform the surveillance functions associated with the present invention. The circuitry 40 has a data signal receiving circuit 44 associated therewith electrically connected through a fiber optic modulator 46 to the data transmitting circuitry 42 in the same array 14 and by wiring 45 in series with the circuitry 40 of the electrode node sections 30 and 32 of the other arrays 14. The modulator 46 is electrically connected to the upper and lower electrode node sections 30 and 32 from which input underwater surveillance signals are fed to a wideband amplifier 48 when the array 14 is fully deployed. The output of the amplifier 48 is filtered into separate low and high band frequencies between 0.001 Hz and 0.1 Hz by a pair of low and high band filters 50 and 52. The filtered signal outputs of the filters 50 and 52 are respectively transmitted through threshold detectors 54 and 56 so as to register detection of selected signal field strength and frequency band through an encoder 58, from which corresponding node number signals are fed through the circuit 44 and the modulator 46 to the other arrays 14 by the wiring 45 or to the transmitting circuitry 42 within the module buoy 16. Electrical power for operating the foregoing referred to components 44, 46, 48, 50, 52, 54, 56 and 58 of the circuitry 40 is supplied from a DC battery 60 through a DC power supply 62 upon closing of a seawater pressure switch 64, in response to the underwater deployment of the array 14.

An information packet of collected signal data outputs from all of the arrays 14 is retransmitted through their associated circuitries 40 to the data transmitter module circuitry 42 within the floating module buoy 16 as diagrammed in FIG. 3. A microcontroller 66 within the circuitry 42 receives the collected data from the modulators 46 and transmits it to an antenna 68 and a GPS receiver 70 for radio frequency transmission from the floating buoy 16. Such radio frequency transmission of the collected surveillance data information is adapted to be received within manned or unmanned air or seawater surface vehicles, or by higher power signal data repeater facilities for transmission to a satellite. The collected surveillance data so received may then be routed as warning signals to a command center to determine the tactical situation.

It will be apparent from the foregoing description that various underwater seawater conditions within a deep water surveillance zone may be detected, such as natural corrosion and cathodic protective conditions surrounding a sea vessel or its electrical machinery. Deep water surveillance coverage is provided by use of the electrode sensing sections 30 and 32 respectively associated with each of the arrays 14, each having relatively small detection ranges. Use of the wideband amplifier 48 within the circuitry 40, having low-noise and low operational power characteristics, advantageously reduces noise, costs and false alarms. The use of the optical fiber 24 with the claddings 34 to form the sensing electrode sections 30 and 32 associated with each of the sensing arrays 14 advantageously accommodates operational interconnection thereof with the low-noise wideband amplifier 48 within each of the array node sections 28 and the communication linkage between all of the arrays 14 and common data transmitting facilities within the module floating buoy 16 such as the circuitry 42 for most thorough surveillance of targeted underwater zones.

As an alternative, the electrode sections 30 and 32 along the exposed portions of the cladding 34 would be covered by silver—silver chloride coatings 72 as shown in FIG. 2. Such coatings 72 improved electrical contact between the seawater and the cladding 34 in order to enhance detection.

Obviously, other modifications and variations of the present invention may be possible in light of the foregoing teachings. It is therefore to be understood that within the scope of the appended claims the invention may be practiced otherwise than as specifically described.

What is claimed is:

1. A system for surveillance of a targeted underwater zone within a body of seawater, comprising: an elongated optical fiber through which signal data is transmitted; floating transmitter means connected to the optical fiber and suspended therefrom within said targeted zone for transmission of radio signals reflecting a collection of the signal data from the targeted zone; and electrode sensing means positioned on the optical fiber for detection of hostile conditions within the targeted zone reflected by said collection of the signal data.

2. The system as defined in claim 1, wherein said electrode sensing means includes a plurality of sensor arrays positioned in spaced relation to each other on the optical fiber and from which the collection of the signal data is derived.

3. The system as defined in claim 2, wherein each of said sensor arrays comprises: metallic electrode cladding covering a predetermined length of the optical fiber; water insulating means protectively covering an intermediate length portion of said cladding for limiting exposure of spaced portions thereof to the seawater through which detection of the hostile conditions is effected; electronic circuitry means mounted on the optical fiber over the insulating means for conversion of said detection of the hostile conditions into the signal data collected from the exposed spaced portions of the cladding; and signal modulator means for transfer of the collected signal data from the electronic circuitry means through the optical fiber to the floating transmitter means.

4. The system as defined in claim 1, wherein said electrode sensing means comprises: a metallic electrode cladding covering a predetermined length of the optical fiber; water insulating means protectively covering an intermediate length portion of said cladding to limit exposure of spaced portions thereof to the seawater for effecting said detection of the hostile conditions; electronic circuitry means mounted on the insulating means for conversion of said detection of the hostile conditions into the signal data collected from the spaced portions of the cladding exposed to the seawater; and signal modulator means for transfer of the collected signal data from the electronic circuitry means through the optical fiber to the floating transmitter means.

* * * * *